Patented Aug. 14, 1945

2,381,883

UNITED STATES PATENT OFFICE 2,381,883

ESTER

Merlin Martin Brubaker, Wilmington, Del., assignor to E. I. du Pont de Nemours & Company, Wilmington, Del., a corporation of Delaware No Drawing. Application December 30, 1940,
Serial No. 372,394

28 Claims. (Cl. 106—252)

This invention relates to new synthetic drying oils and to coating compositions containing them.

Of the natural drying oils, China-wood oil, perilla oil, and oiticica oil are outstanding in their ability to form hard, tack-free, water-resistant films when properly formulated into varnish and enamel compositions. Unfortunately, however, these oils are not produced in this country in substantial quantities and have to be imported. This difficulty is increased by the fact that they are subject to wide fluctuations in price, availability, and quality. Also, as is well known, some of these oils have a tendency to form films that "crystallize" or "frost."

Extensive research has therefore been expended in an effort to develop synthetic compositions which possess the drying properties and film-forming characteristics of these natural drying oils, and in a further endeavor to produce synthetic drying compositions which have even better properties and more uniform quality than the natural drying oils. Such prior attempts, however, have in the main been unsuccessful in producing synthetic drying oils which have properties superior to the natural drying oils, or have been uneconomical in that the materials produced have been so expensive they could have no practical commercial use.

This invention has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of polyunsaturation, and other elements of chemical structure, which will impart rapid drying film properties to said esters.

Another general objective is the preparation of esters, suitable for use in coating compositions, from acids which are available economically or may be made so readily.

An additional objective is the provision of methods of making these new esters.

The above and other objects appearing hereinafter are accomplished by preparing, for example, by one of the methods subsequently described in detail, a polyhydric alcohol ester of a cinnamalacetic acid, as defined below, alone or in combination with at least one other acid, in particular monofunctional monocarboxylic acids of different structure.

The expression "a cinnamalacetic acid" is used in a generic sense to include, not only the specific compound cinnamalacetic acid

($C_6H_5CH\!=\!CHCH\!=\!CHCOOH$)

but also those acids having one or more substituents on the chain, or in the ring, or both. The presence or absence of such substituents does not change the particular sequence of double bonds or the location of the phenyl group, which are considered to be the critical elements of structure.

The term "monofunctional" means that the monocarboxylic acid contains no group capable of undergoing reaction with the carboxyl group under normal esterification conditions; i. e., acids having an OH, $NH_2$, or NHR group would not be suitable. These different monofunctional monocarboxylic acids are preferably unsaturated, the acids of natural drying or semi-drying oils being most useful.

In one of the preferred methods of carrying out the invention, a cinnamalacetic acid is reacted with a polyhydric alcohol which has been partially esterified with a different acid or acids. When these polyhydric alcohol partial esters are glycerol partial esters of a long chain fatty acid, they are most suitably obtained by heating fatty oils in the usual way with glycerol and, preferably, an ester-interchange catalyst. In carrying out this alcoholysis step, the oil and free polyhydric alcohol, in proportions calculated to give the degree of alcoholysis desired, are placed, along with a small amount of alcoholysis catalyst (e. g., 0.001–0.01% sodium hydroxide based on the oil), in a reactor fitted with an agitator, a device to measure the temperature, and a gas inlet. The mixture is then heated with stirring for 1–2 hours at about 200–225° C., an oxygen-free inert gas such as carbon dioxide or nitrogen being passed into and over the mixture. In the esterification step, this polyhydric alcohol partial ester is usually cooled to about 100–150° C., and the cinnamalacetic acid is introduced in approximately the amount sufficient to esterify the free hydroxyl groups calculated to be present from the initial proportions of oil and polyhydric alcohol. A hydrocarbon solvent, such as toluene, is next added in an amount sufficient to produce boiling when the temperature reaches about 200–225° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction can be completed in periods of time ranging from 3 to 20 hours; thus, when the temperature is around 200° C., the process is usually complete within 8 hours. The reaction can be accelerated if desired by means of catalysts. The progress of the reaction can be followed by acid number determinations, the heating being stopped when the acid number reaches or approaches constancy, or a desired value. There is obtained a solution of the new drying oil from which the solvent can be removed by distillation if desired. The resulting oil, or its solution as obtained in the process, can be formulated, by conventional methods used with natural drying oils, into valuable coating compositions. For such purposes, it can be used alone, or in blends with resins and/or natural drying or semi-drying oils. Hot blending of these new oils with the natural drying or semi-drying oils gives coating composition vehicles of unique properties.

Another good way to carry out the process is to heat together the cinnamalacetic acid, polyhydric alcohol, and other acid until the desired degree of esterification is obtained.

If the simple esters are desired, they can be obtained by esterifying a cinnamalacetic acid with a polyhydric alcohol by heating these materials together.

In preparing the esters of the present invention, certain precautions are often necessary in order to obtain satisfactory results from a number of standpoints. These precautions are made necessary by the high reactivity of the cinnamalacetic acids at the elevated temperatures required in the preparation of the esters. Accordingly, for best results, the esterification reaction for the preparation of the drying oil is preferably carried out at as low a temperature as is practical. As is noted above, and as will be seen from the examples, another such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is mentioned, sufficient of a 2% cobalt naphthenate solution has been used to give the indicated content of cobalt metal, this proportion being based on oil.

The ester compositions in the titles of each example are an index to the proportion of cinnamalacetic acid radicals in the product; i. e., they do not mean the product actually contains the stated percentages of, for example, the compounds linseed acids glyceride and cinnamalacetic acid glyceride. To illustrate, a product referred to as having 24.0% cinnamalacetic acid glyceride and 76.0% linseed acids glyceride is a product prepared from proportions of reactants so chosen as to yield a mixture of the two mentioned glycerides in the stated proportions by weight, theoretically, i. e., if it be assumed no mixed ester is formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are undoubtedly present. The significance of the cinnamalacetic acid ester content is discussed following the examples.

EXAMPLE 1

*Glycerol mixed ester of linseed oil acids and cinnamalacetic acid*

| | Percent |
|---|---|
| Cinnamalacetic acid glyceride | 24.0 |
| Linseed acids glyceride | 76.0 |

The diglyceride of linseed oil acids is first prepared by agitating 1300 parts of alkali-refined linseed oil with 69.4 parts of refined glycerol in an inert atmosphere at 250° C. for 1.5 hours. To 58.5 parts of this diglyceride is added 16.5 parts of cinnamalacetic acid (Dobner, Berichte 35, 2137; 1902) and 10 parts of toluene. This mixture is heated under an atmosphere of deoxidized nitrogen at a temperature of 200–230° C. for a period of about 5 hours. The solution is cooled, filtered, and the solvent removed at 100° C. and 10 mm. pressure during a period of 1 hour. This mixed ester, chemical composition as above, is a fluid oil which has the following physical and analytical values: $N_D^{25}$, 1.5083; $d_4^{25}$, 0.9863; hydroxyl No. 6.7; iodine No. 135.3; saponification No. 202.8; acid No. 20.1; color 3.7.

Films of the product containing 0.03% cobalt dry tack-free on substrates such as bare steel, wood, or undercoats at 25° C. during a period of 8–15 hours. The dried films are clear, smooth, glossy, tough, and hard. Linseed oil remains tacky under the same drying conditions and after the same period of time, and dried films are soft. Films of the mixed ester of this example, containing 0.03% cobalt, when baked at 100° C., are completely tack-free and very hard in about 1.5 hours. Films aged at 100° C. for 18–20 hours do not become brittle or show appreciable degradation but still retain excellent hardness, flexibility, toughness, and adhesion. Durability exposures in Delaware over a period of 8 months (45° south exposure) gave better results than a 45-gallon China wood oil/limed rosin varnish.

Iron oxide pigment, 36 parts, and 100 parts of the above oil are ground in a pebble mill for 6 days, yielding a well-dispersed enamel base. Thirty-six parts of this mill base is thinned with 10 parts of mineral spirits and treated with 0.048 part cobalt drier. Films brushed on steel girders dry overnight to hard coatings which are much superior to a corresponding linseed oil paint.

The above mixed ester can be formulated into a varnish in the following manner: The oil, 7.2 parts, is bodied to a high viscosity by heating under nitrogen for 5 minutes to 290° C., followed by holding the temperature constant at 290° C. for an additional 10 minutes. To this product is added 3.2 parts of a 64% limed rosin, 0.1 part of manganese resinate, 1.7 parts of lead naphthenate, and 2.7 parts of mineral spirits. This composition corresponds to a 45-gallon varnish containing 4% lead and 0.04% manganese, based on the oil. This product dries in 7 hours in the air at ordinary room temperature. Films over bare steel and undercoated steel are comparable in properties to those from analogous varnishes prepared from China wood oil/limed, leaded rosin and perilla oil/"Amberol" varnishes of 45-gallon oil length; durability in Delaware over a 4.5 months' exposure period parallels that of these controls.

Example 2

Glycerol mixed ester of linseed oil acids and cinnamalacetic acid

|  | Percent |
|---|---|
| Cinnamalacetic acid glyceride | 58.0 |
| Linseed acids glyceride | 42.0 |

The monoglyceride of linseed oil is prepared by heating 43.9 parts of alkali-refined linseed oil, 9.3 parts of refined glycerol, and 0.01 part of litharge in an inert atmosphere at about 200° C. for 1.5 hours. To this monoglyceride is added 54.0 parts of cinnamalacetic acid and 20 parts of toluene. This mixture is heated under an atmosphere of deoxidized nitrogen at a temperature of about 200–230° C. for about 11 hours. The toluene is removed by distillation, and the excess acid is removed by blowing with nitrogen. The mixed glyceride thus prepared, chemical composition as above, has the following physical and analytical values: hydroxyl No. 9.7; iodine No. 101.3; saponification No. 190.6; acid No. 11.0.

Films of the product, containing 0.03% cobalt, and diluted to a viscosity of E with an equal amount of mineral spirits, dry tack-free at ordinary room temperature during the course of a few hours, becoming dust-free after about 2 hours. The dried films are clear, smooth, glossy, tough, and hard, and are greatly superior in the rate of drying, hardness, and general properties to films of straight linseed oil. After exposure for 2 months in Delaware, the product is giving excellent results.

The product of this example can be made into an enamel as follows: A mixture of 33 parts of the mixed glyceride, 16 parts of titanium dioxide pigment, 16 parts of antimony oxide pigment, and 40 parts of mineral spirits is ground in a pebble mill for about 100 hours. To the resulting enamel is added sufficient cobalt naphthenate drier to give a composition containing 0.03% cobalt. The enamel is then diluted to a spraying viscosity by the addition of 25 parts of mineral spirits. A film formed by spraying the resulting enamel onto wood or steel is essentially tack-free after about 15 hours at room temperature and shows excellent through-hardening after overnight drying.

A blend prepared by mixing 15 parts of linseed oil with 10 parts of the above oil, in the presence of 0.03% cobalt, dries tack-free and hard overnight at room temperature. This mixture is much superior in drying rate and hardness to linseed oil.

Example 3

Triester of glycerol and cinnamalacetic acid

Eighty-three parts of the acid chloride of cinnamalacetic acid (prepared by heating a solution of 75 parts of cinnamalacetic acid, 120 parts of petroleum ether, and 75 parts of thionyl chloride in a steam bath for 1.5 hours, and removing the solvent and excess thionyl chloride by vacuum distillation) is placed in 300 parts of chloroform; 13 parts of purified glycerol is added; and 35 parts of pyridine, dissolved in 100 parts of chloroform, is introduced dropwise into the cold solution. The resultant mixture is stirred at about 0° C. for 0.5 hour, and then is heated at about 40° C. for 0.5 hour. The cooled solution is thoroughly washed successively with water, with dilute alkali, with dilute hydrochloric acid, and again with water. The triester is then isolated by removing the solvent under vacuum. It has the following physical and analytical values: iodine No. 127.4; saponification No. 439.1; acid No. 4.5; hydroxyl No. 60.5.

A solution of this ester in tetrachlorethane (viscosity E), containing 0.03% cobalt, when applied to a surface such as steel or wood, becomes dust-free at ordinary room temperature in about 15 hours, and tack-free after 3 days. The films thus obtained are hard, glossy, and very adherent to steel, with fairly good toughness.

Example 4

Glycerol mixed ester of soya bean oil acids and cinnamalacetic acid

|  | Percent |
|---|---|
| Cinnamalacetic acid glyceride | 25.6 |
| Soya bean acids glyceride | 74.4 |

Soya bean oil, 131 parts, 6.8 parts of refined glycerol, and 0.1 part of litharge are heated at approximately 175° C. for 1.5 hours. The mixture is then cooled to about 125° C. and 39.2 parts of cinnamalacetic acid is added, together with 18 parts of toluene. The mixture is next heated at 205–220° C. in an atmosphere of pure nitrogen for about 3.5 hours. The toluene is removed by distillation, and the excess acid is removed by blowing with nitrogen at 200° C. for 45 minutes. The fluent, light-colored oil thus prepared, chemical composition as above, has the following physical and analytical values: $N_D^{25}$, 1.5045; $d_4^{25}$, 0.9919; hydroxyl No. 30.9; iodine No. 114.1; saponification No. 186.6; acid No. 4.4.

The film flowed from the oil, diluted to viscosity C with mineral spirits and containing 0.03% cobalt, dries dust-free at ordinary room temperature in about 15 hours and tack-free and tough in 2 days. The oil dries much more rapidly than straight soya bean oil or linseed oil under similar conditions, and is superior in hardness.

EXAMPLE 5

*Glycerol mixed esters of linseed oil acids and α-methylcinnamalacetic acid*

| | Percent |
|---|---|
| α-Methylcinnamalacetic acid glyceride | 40.5 |
| Linseed acids glyceride | 59.5 |

Refined linseed oil, 51.5 parts, 5.5 parts of purified glycerol, and about 0.05 part of litharge are heated at about 175° C. for 1 hour. To the cooled material is then added 33 parts of α-methylcinnamalacetic acid (M. P. 160.5–162° C.) (Macleod, American Chem. J. 44, 338 (1910)) and 20 parts of toluene. Heating is carried out at about 200–230° C. for 17 hours. The oil thus prepared, chemical composition as above, has the following physical and analytical values: hydroxyl No. 10; iodine No. 128; saponification No. 220.2; acid No. 6.0.

A film, flowed from a solution diluted to viscosity D with mineral spirits and containing 0.03% cobalt, dries tack-free at ordinary room temperature in less than 15 hours. This mixed glyceride dries much more rapidly than does unmodified linseed oil, and films are much harder and tougher. After 2 months' exposure in Delaware (45° south exposure), films of this product are in excellent condition, being superior to those of a 45-gallon limed rosin-China wood oil varnish control.

A mixture of the above oil, 75 parts, with China wood oil, 25 parts, dries tack-free very rapidly in the presence of 0.01% cobalt drier, and does not show the wrinkling or frosting usually encountered with mixtures of China wood oil and other drying oils.

EXAMPLE 6

*Hexamethylene glycol mixed ester of linseed oil acids and cinnamalacetic acid*

| | Percent |
|---|---|
| Hexamethylene glycol ester of cinnamalacetic acid | 41.0 |
| Hexamethylene glycol ester of linseed oil acids | 59.0 |

Hexamethylene glycol, 29.3 parts, 69.8 parts of refined linseed oil acids, and 43.5 parts of cinnamalacetic acid are heated together in toluene solution at about 200–220° C. for about 14 hours. The toluene is then removed by distillation, and the excess acids are removed by blowing with nitrogen. The resulting oil, chemical composition as above, has the following physical and analytical values: hydroxyl No. 9.2; iodine No. 109; saponification No. 179; acid No. 9.2; $N_D^{25}$, 1.5158.

This oil, with 0.1% cobalt drier, sets up overnight at ordinary room temperature to soft flexible films. The drying and film properties are superior to those of linseed acids diester of hexamethylene glycol.

EXAMPLE 7

*Glycerol mixed ester of linseed oil acids and α-cyanocinnamalacetic acid*

| | Percent |
|---|---|
| α-Cyanocinnamalacetic acid glyceride | 26.6 |
| Linseed acids glyceride | 73.4 |

The diglyceride of linseed oil is prepared by heating 87.8 parts of refined linseed oil and 4.6 parts of purified glycerol in the presence of about 0.1 part of litharge at 210° C. for 1 hour. To the cooled solution are then added 32 parts of α-cyanocinnamalacetic acid (Wittig and Kethur, Ber. 69, 2081 (1936)) and 18 parts of toluene. Heating is maintained at about 215–250° C. for 1.5 hours in the presence of a pure nitrogen atmosphere. The toluene and excess acid are next removed by blowing with nitrogen. The oil thus prepared, chemical composition as above, has the following physical and analytical values: $N_D^{25}$, 1.5365; $d_4^{25}$, 0.9929; hydroxyl No. 2.55; iodine No. 133; saponification No. 209; acid No. 3.85.

With 0.03% cobalt, this oil dries overnight over steel at ordinary room temperature to a practically tack-free condition, is quite hard, and adheres well. The oil dries more rapidly than unmodified linseed oil under similar drying conditions and is much superior in hardness and toughness.

EXAMPLE 8

*Hexamethylene glycol mixed ester of α-cyanocinnamalacetic acid and linseed oil acids*

| | Percent |
|---|---|
| Hexamethylene glycol ester of α-cyanocinnamalacetic acid | 43.5 |
| Hexamethylene glycol ester of linseed oil acids | 56.5 |

Hexamethylene glycol, 21 parts, 50.0 parts of linseed oil acids, 35.7 parts of α-cyanocinnamalacetic acid, and 18 parts of toluene are heated together in an atmosphere of pure nitrogen for 5.5 hours at about 200° C. Solvent and excess acids are removed by blowing the hot oil with nitrogen, and the oil is clarified by filtration. The resulting oil, chemical composition as above, has the following physical and analytical values: Hydroxyl No. 11; iodine No. 82; saponification No. 171; acid No. 5.0.

Films of this oil, containing 0.03% cobalt, become dust-free in 15 hours at 25° C. and are well set-up in 5 days. The films are flexible, and the drying and film properties are very much better than those of the hexamethylene glycol diester of linseed oil acids.

It will be noted that the examples given have as a part of their caption the amounts of polyhydric alcohol simple esters of each acid that are present in the products, theoretically, i. e., if it be assumed that no mixed esters are formed. The meaning of these figures is discussed hereinbefore.

It has been found that, for each particular combination of polyhydric alcohol, cinnamalacetic acid, and other monocarboxylic acid, there is a range of cinnamalacetic acid-polyhydric alcohol simple ester content, within which the products dry fastest, have best film properties generally, and can be made most easily.

In regard to the glycerol mixed esters of cinnamalacetic acids generally, and more particularly in regard to glycerol mixed esters of cinnamalacetic acids and drying or semi-drying oil acids (especially linseed oil acids), it will usually be found that the most valuable products have on the order of 5–60% cinnamalacetic acid glyceride.

The proportions for best results will, however, vary somewhat with the particular ingredients.

Thus, with glycerol, cinnamalacetic acid itself, and linseed oil acids, this range is from about 10% to about 45% of the cinnamalacetic acid glyceride. As the amount is lowered to 0%, the drying time increases, approaching and reaching that of linseed oil. As the amount is increased from about 45%, the products are increasingly difficult to prepare, at least in part because of the increasing tendency to gelation. At 100%, the product dries quite rapidly, but the films tend to be less flexible and require plasticization in order to be of greatest value for most purposes. Particularly valuable products can be obtained by blending with linseed or other oils, preferably at elevated temperatures.

After the film-forming properties of esters obtained from different proportions of a particular polyhydric alcohol, cinnamalacetic acid, and other monocarboxylic acid have been established by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the cinnamalacetic acid. More specifically, when the polyhydric alcohol is glycerol and the other acid is drying or semi-drying oil acids, it is possible, by appropriate selection of proportions, to prepare a mixed glyceride having desired degree of improvement (up to the maximum possible for the ingredients involved) as compared to the drying or semi-drying oil whose acids are being used.

Thus, from soya bean oil, glycerol, and cinnamalacetic acid, it is possible to make oils that in drying ability and film properties are at least equal (about 10% cinnamalacetic acid glyceride) or definitely superior (above 10% cinnamalacetic acid glyceride) to linseed oil.

Similarly, it is possible to make, from linseed oil, glycerol, and a cinnamalacetic acid, oils which are equal to or better than oils which are superior to linseed oil. For example, a glycerol mixed ester having only 5% cinnamalacetic acid glyceride becomes the equal of dehydrated castor oil; one having about 20% of the cinnamalacetic acid glyceride is like China wood oil, and can be employed in place of China wood oil in the manufacture of varnishes; and those having more than 20% of the cinnamalacetic acid glyceride are superior to China wood oil.

In the case of perilla and oiticica oils, which are intermediate in drying properties between linseed and China wood oils, an introduction of about 5% cinnamalacetic acid glyceride makes them the equal of, and more than 5% makes them superior to, China wood oil.

A remarkable characteristic of those of the new oils which are in the China wood oil range is that they dry to clear, smooth films and do not frost or wrinkle as does China wood oil.

The desired proportion of cinnamalacetic acid glyceride is normally obtained by using the calculated amount of a cinnamalacetic acid or esterifiable derivative. However, an effect which approaches or equals the behavior of the mixed ester so made can be obtained by preparing a mixed ester of cinnamalacetic acid glyceride content higher than that desired, and blending it, preferably at elevated temperature, with the drying oil whose acids are being used (or a different oil if desired) in an amount which is calculated to give a mixed ester of the desired cinnamalacetic acid glyceride content. Suitable conditions are, for example, the heating of the two oils, with stirring and in an inert gas atmosphere, for about 0.5 hour at about 200° C. Under these conditions, it is probable that some interchange occurs, since the film-forming properties are usually better than for cold blends of the two oils.

The esters of the present invention can be made by reacting the polyhydric alcohol only with the cinnamalacetic acid (or an esterifiable derivative), or with the cinnamalacetic acid and another monocarboxylic acid or acids (or their esterifiable derivatives) simultaneously or successively in any order. Or a polyhydric alcohol simple ester of either the cinnamalacetic acid or the other acid or acids can be reacted successively with additional polyhydric alcohol and the remaining acid or acids. In the first, i. e., alcoholysis, step of this latter process, an ester interchange catalyst such as litharge, sodium hydroxide, sodium glycerolate, etc., is preferably included in small amount, suitably from 0.001% to 1.0%.

Suitable types of esterifiable derivatives of both the cinnamalacetic acids and the different acids are the anhydride, an acid halide, or an ester with an alcohol more volatile than the polyhydric alcohol whose ester is to be prepared.

Solvents and other preparative details should be adjusted to the method chosen, the method of so doing being apparent to one skilled in the art. When the solution method heretofore discussed is to be used, any inert water-immiscible liquid which dissolves the product is suitable, hydrocarbons being preferable, and the amount can be varied as desired. Suitable specific solvents include toluene, xylene, cymene, amyl benzene, tetrachloroethane, anisol, and cyclohexanone. Aromatic hydrocarbons, chlorinated solvents, ethers, and ketones are suitable in general. A boiling point in the range 100–200° C. is desirable. The process of the invention can also be carried out in the absence of a solvent.

In addition to glycerol and hexamethylene glycol, other polyhydric alcohols can be used in the present invention, such as pentaarythritol, methyltrimethylolmethane, erythritol, p,p'-di(2-hydroxyethyl)benzene, decamethylene glycol, diethylene glycol, sorbitol, and cyclohexyl-1,2-dicarbinol.

The monofunctional monocarboxylic acid or acids can be any monofunctional monocarboxylic acid, or any mixture of such acids, such as mixtures of linseed and China wood oil acids. Other specific acids that are suitable include perilla oil acids, oiticia oil acids, lauric acid, p-toluic acid, crotonic acid, cinnamic acid, corn oil acids, cottonseed oil acids, coconut oil acids, furoic acid, sorbic acid, quinolinic acid, alpha-naphthionic acid, oleic acid, stearic acid, phenoxyacetic acid, and the like. The acids may be aromatic or aliphatic; open or closed chain and, if the latter, monocyclic, polycyclic, homocyclic, or heterocyclic; saturated or unsaturated; straight or branched chain; and substituted or not by other groups or atoms, such as ether, ketone, halogen, etc., which do not interfere with the desired esterification reaction.

Any cinnamalacetic acid, as the term is hereinbefore explained, can be employed. The table below gives other specific suitable acids by name, formula and source.

ALTERNATIVE CINNAMALACETIC ACIDS

| Name of acid | Formula | Source |
|---|---|---|
| 2,5-diphenylpentadien-2,4-oic | $C_6H_5CH=CH-CH=C(C_6H_5)-COOH$ | $C_6H_5CH=CHCHO + C_6H_5CH_2COOC_2H_5$ |
| 2-furyl-5-phenylpentadien-2,4-oic | $C_6H_5CH=CHCH=C(\text{furyl})-COOH$ | $\phi CH=CHCHO + \text{(furyl)}-CH_2COOC_2H_5$ |
| 7-phenylheptatrien-2,4,6-carboxylic acid-4 | $C_6H_5CH=CH-CH=C(CH=CHCH_3)-COOH$ | $\phi CH=CHCHO + CH_3CH=CHCH_2COOR$ |
| 3-methyl-5-phenylpentadien-2,4-oic | $C_6H_5CH=CH-C(CH_3)=CH-COOH$ | $\phi CH=CHC(O)-CH_3 + BrCH_2COOR$ |
| 5,5-diphenylpentadien-2,4-oic | $(C_6H_5)_2CH=CH-CH=CH-COOH$ | $\phi_2CH=CHCHO + CH_2(COOH)_2$ |
| 5-p-tolylpentadien-2,4-oic | $p-CH_3C_6H_4CH=CHCH=CHCOOH$ | $p-CH_3-C_6H_4-CH=CHCHO + CH_2(COOH)_2$ |
| 2-cyclohexyl-5-phenylpentadien-2,4-oic | $C_6H_5CH=CH-CH=C(C_6H_{11})-COOH$ | $\phi CH=CHCHO + C_6H_{11}CH_2COOCH_3$ |
| 2-cyclopentadienyl-5-phenylpentadien-2,4-oic | $C_6H_5CH=CHCH=C(C_5H_5)-COOH$ | $\phi CH=CHCHO + ClCH_2COOH + \text{(cyclopentadiene)} + K$ |

The examples and general description indicate that the new oils of the present invention are generally useful for formulation into coating compositions, which latter can also contain (as needed and desired for the particular purpose to which they are to be put) natural resins; synthetic resins; cellulose derivatives, such as nitrocellulose and cellulose acetate; waxes; natural drying oils; other oils; pigments; fillers; cork; bitumens; solvents; etc. The new oils can be blown or heat-bodied in a manner quite similar to the natural drying oils, and they react toward driers in a manner generally similar to linseed oil. Driers and solvents which are effective with natural drying oils work well with the new oils, although, if very light-colored products are to be made, lead driers are undesirable.

These compositions can be applied to many kinds of surfaces and materials, e. g., metal, wood, paper, linen, silk, cotton textiles, regenerated cellulose wrapping foil, etc. Specific manufacturers that can be so produced are linoleum, patent leather, linoxyn-type materials, coated copper wire, oiled cloth, oiled silk, and sandpaper. The products of the invention can also be made up into molding compositions, putties, and the like. In addition, they can be employed as modifying agents for urea-formaldehyde and phenol-formaldehyde resins.

It will be apparent from the foregoing description that new mixed esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as for example, the ability to form films which do not crystallize, wrinkle, or frost, as do films from the more rapidly drying natural oils. Furthermore, it is possible to take any fatty oil, including one that has a low order of drying, and, by substituting a part of the fatty acid making up that oil by a cinnamalacetic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:
1. A polyhydric alcohol ester of a cinnamalacetic acid.
2. A glycerol ester of a cinnamalacetic acid.
3. A glycerol ester of cinnamalacetic acid.
4. A polyhydric alcohol mixed ester of a cinnamalacetic acid and another monofunctional monocarboxylic acid.
5. A glycerol mixed ester of a cinnamalacetic acid and another monofunctional carboxylic acid.
6. A glycerol mixed ester of a cinnamalacetic acid and the acids of a natural fatty oil.
7. A glycerol mixed ester of a cinnamalacetic acid and the acids of a natural drying oil.
8. A glycerol mixed ester of cinnamalacetic acid and linseed oil acids.
9. The ester of claim 5 containing that proportion of cinnamalacetic acid radicals which theoretically gives a content of glycerol simple ester of that acid in the range of about 5–60% by weight.
10. The ester of claim 7 containing that proportion of cinnamalacetic acid radicals which theoretically gives a content of glycerol simple ester of that acid in the range of about 5–60% by weight.
11. The ester of claim 8 containing that proportion of cinnamalacetic acid radicals which theoretically gives a content of about 10–45% of cinnamalacetic acid glyceride.
12. A coating composition containing the product of claim 1.
13. A coating composition containing the product of claim 4.

14. A coating composition containing the product of claim 1 and a drying fatty oil.

15. A coating composition containing the product of claim 4 and a drying fatty oil.

16. A varnish containing the product of claim 1, a drier, and a varnish solvent.

17. A varnish containing the product of claim 4, a drier, and a varnish solvent.

18. A varnish containing the product of claim 1, a drying oil, a drier, and a varnish solvent.

19. A varnish containing the product of claim 4, a drying oil, a drier, and a varnish solvent.

20. A varnish comprising a glycerol mixed ester of cinnamalacetic acid with the acids of a natural drying oil, a drier, and a varnish solvent.

21. An enamel containing the product of claim 1, a pigment, a drier, and a volatile solvent.

22. An enamel containing the product of claim 4, a pigment, a drier, and a volatile solvent.

23. An enamel containing a glycerol mixed ester of cinnamalacetic acid and the acids of a natural drying oil, a pigment, a drier, and a volatile solvent.

24. The method which comprises reacting a polyhydric alcohol with a cinnamalacetic acid and at least one monofunctional monocarboxylic acid of different structure.

25. The method which comprises reacting a polyhydric alcohol with a cinnamalacetic acid and the acids of a natural fatty oil.

26. The method which comprises reacting a polyhydric alcohol with a cinnamalacetic acid and the acids of a natural drying oil.

27. The method of improving the drying of natural fatty oils which comprises reacting these oils successively with a polyhydric alcohol and a cinnamalacetic acid.

28. The method which comprises reacting a cinnamalacetic acid with a polyhydric alcohol partial ester of natural drying oil acids.

MERLIN MARTIN BRUBAKER.